United States Patent [19]

Strybel

[11] 4,213,216
[45] Jul. 22, 1980

[54] SERVICE TOOL

[75] Inventor: Richard V. Strybel, Elk Grove Village, Ill.

[73] Assignee: Gould Inc., Rolling Meadows, Ill.

[21] Appl. No.: 950,955

[22] Filed: Oct. 13, 1978

[51] Int. Cl.² .............................................. B25F 1/00
[52] U.S. Cl. ........................................ 7/170; 29/235
[58] Field of Search ...................... 7/169, 170; 29/213, 29/235, 237

[56] References Cited

U.S. PATENT DOCUMENTS

| | | | |
|---|---|---|---|
| 2,226,702 | 12/1940 | Berger et al. | 29/237 |
| 3,422,469 | 1/1969 | Tunstall et al. | 7/170 |
| 3,504,388 | 4/1970 | Tunstall et al. | 7/170 X |

*Primary Examiner*—James G. Smith
*Attorney, Agent, or Firm*—Russell E. Baumann; Edward E. Sachs

[57] ABSTRACT

A service tool structure for effecting improved, simplified removal and installation of end fitting gaskets, adjustment of the adjustable valve depressor, and storage of spare gaskets and depressor elements. The tool structure is arranged to provide a partial installation of the gasket in the hose coupling with a first projection portion thereof and a completion of the installation of the gasket therein by a second projection portion thereof. The first projection portion may be further arranged to define structure for effecting adjustment of the valve depressor, the gasket being arranged to fit coaxially about the valve depressor adjusting structure. A threaded third projection portion of the tool structure is arranged to be threaded into the installed gasket so as to provide a sufficiently secure connection thereto to permit withdrawal of the gasket from the hose coupling as in replacement of the gasket. A fourth portion of the tool structure defines a suitable selectively closed recess for storing spare gaskets and valve depressors.

14 Claims, 6 Drawing Figures

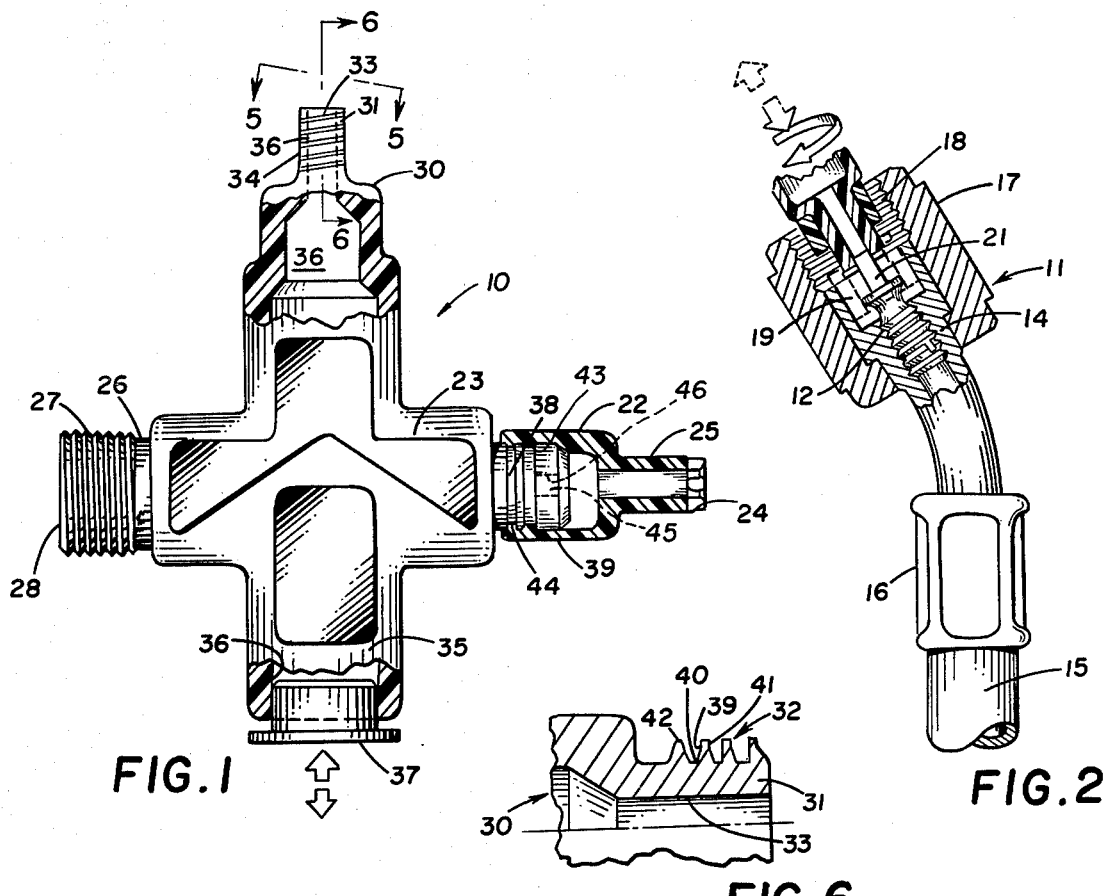
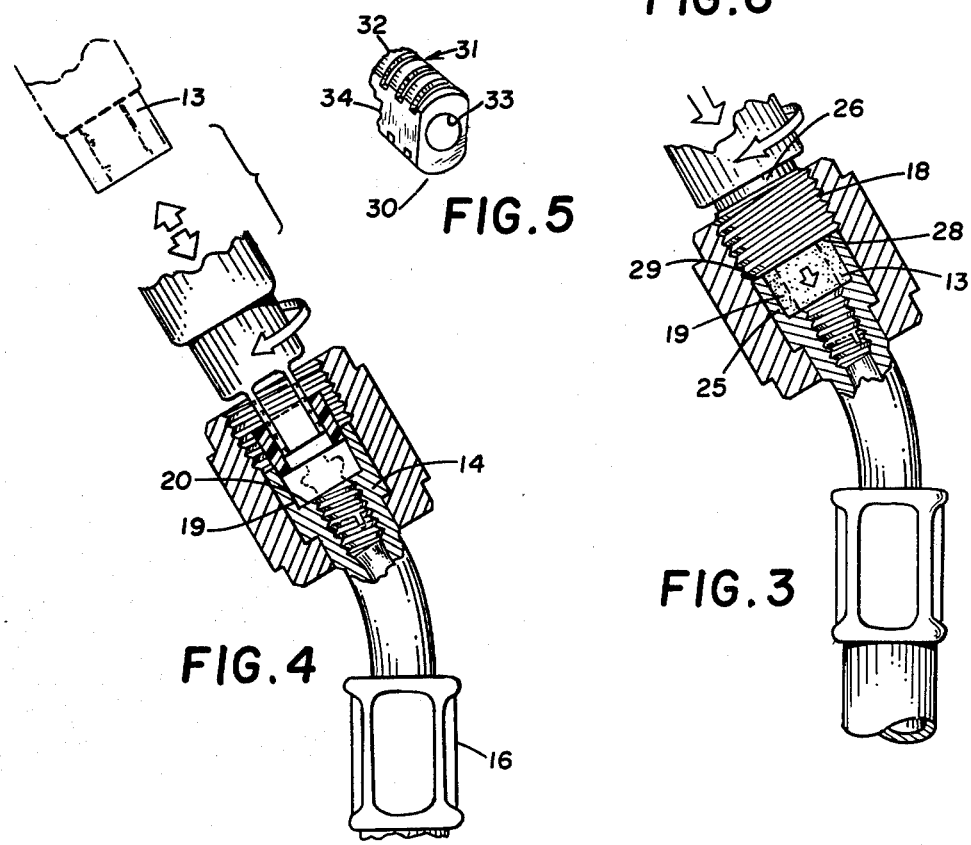

SERVICE TOOL

BACKGROUND OF THE INVENTION

1. Field of the Invention

This invention relates to the art of hose couplings, and in particular to an improved service tool for servicing the gasketed valve depressor portion of the hose coupling.

2. Description of the Prior Art

In U.S. Pat. No. 1,506,102, Arthur Wise shows a combination tool for removing tacks and nails and including a gasket remover. The tool is utilized to remove a rubber gasket from an air hose by inserting a hooked member between the gasket and the metal union and using the tool as a lever to pry the gasket out of the socket. The hook further is used to clean out foreign matter from the recess after the gasket is removed.

Julius Berger et al, in U.S. Pat. No. 2,226,702, shows a tool for fixing hose unions. The tool is arranged to install a nipple in a hose socket.

In U.S. Pat. No. 2,679,654, Oakley W. Hosking shows a tire inflating and servicing device wherein a tool is provided with a slotted portion for removing the tire tube valve. The tool is further provided with a threaded spike which may be applied to the valve inside so as to permit removal of the valve inside. The tool further includes means for storing a valve inside. Bore 31 extends through the handle so as to provide a connection through the hose 10 to the tire controlled by the valve inside 28.

James Allen Ellis, in U.S. Pat. No. 2,851,768, shows a threaded insert removing and applying tool for removing a threaded valve seat from a valve body. The tool is arranged to unscrew the valve seat from the threaded bore by a turning operation.

In U.S. Pat. No. 3,422,469, Wilfred Tunstall et al show a hose coupling tool utilizing a gasket installing and removing means at one end of the tool in the form of a hook which is used to pry the gasket out of the recess. The hook may also be used to tamp the gasket into place in the coupling.

Wilfred Tunstall et al, in U.S. Pat. No. 3,504,388, show a hose coupling tool utilizing a similar hook gasket remover.

SUMMARY OF THE INVENTION

The present invention comprehends an improved service tool structure for use in servicing charging hose and fittings provided with adjustable core depressors for controlling the valve means thereof. The service tool provides simplified installation and removal of the end-fitting gaskets. Further, the service tool provides facilitated adjustment of the adjustable depressor and may include means defining a storage cavity for maintaining spare gaskets and core depressors.

More specifically, the service tool structure of the present invention includes a handle portion, a first projection on the handle portion adapted to have the gasket to be installed coaxially carried thereon for coaxial insertion of the first projection and gasket thereon into an outer portion of the coupling recess surrounding the core depressor to dispose a projecting portion of the gasket about the axially outer portion of the depressor. A second projection on the handle defines an end surface having a transverse extent similar to that of the gasket. The second projection defines threaded means cooperating with the threaded outer portion of the hose coupling recess for threadedly urging the end surface axially inwardly against the outer end of the gasket to thereby urge the gasket fully about the valve depressor in a fully installed disposition within the recess.

The first projection of the tool further defines means for rotating adjustably the valve depressor.

The hose coupling may define an annular shoulder at the outer end of the recess inner portion. The second projection portion of the handle abuts the shoulder at the inward limit of movement thereof, whereby the outer end of the gasket is effectively disposed at the plane of the shoulder in the installed disposition thereof.

The axially threaded length of the tool structure second projection portion is approximately equal to that of the recess threaded outer portion.

The tool may include a third projection on the handle defining a threaded distal portion adapted to be threaded into the gasket installed in the recess for use in pulling the gasket forcibly therefrom as in replacement of the gasket.

The third projection may define an axial bore adapted to receive the outer end of the core depressor during the gasket removal operation.

The third projection may define flatted sides and, in the illustrated embodiment, the threaded distal portion of the third projection is defined by a helical groove. More specifically, the helical groove effectively defines an interrupted helical thread on the handle projection for effectively positively engaging the interior of the gasket to permit a forcible withdrawal thereof from the recess.

Thus, the service tool structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a service tool structure embodying the invention with portions shown broken away to facilitate illustration of the structure;

FIG. 2 is a fragmentary side elevation partially broken away illustrating the use of the tool in adjusting the valve depressor of the hose coupling;

FIG. 3 is a side elevation partially broken away to illustrate the preliminary mounting of the gasket in the hose coupling recess by a first projection portion of the tool;

FIG. 4 is a side elevation partially in section illustrating the use of a second portion of the tool in effecting a fully installed disposition of the gasket within the recess and about the valve depressor;

FIG. 5 is a fragmentary end perspective view of the gasket removing portion of the tool; and FIG. 6 is a fragmentary section of the gasket removing portion taken substantially along the line 6—6 of FIG. 1.

DESCRIPTION OF THE PREFERRED EMBODIMENT

In the exemplary embodiment of the invention as disclosed in the drawing, a service tool structure generally designated 10 is shown for use with a hose coupling generally designated 11 in selectively adjusting an adjustable valve core depressor 12 thereof and in selectively installing and removing a suitable sealing gasket 13 relative thereto.

In the illustrated embodiment, the hose coupling includes a nipple 14 installed on the distal end 15 of a hose, such as an air hose, as by suitable crimped connector 16. The hose coupling further includes an outer nut member 17 embracing the nipple 14.

As shown, the nut defines an outer threaded recess portion 18 and the nipple defines an inner continuation recess portion 19 terminating in an annular shoulder 20. The adjustable core depressor 12 is threaded into the nipple and defines an outer rotatively adjustable portion 21 exposed within the nipple recess 19 and nut recess 18. Rotation of the core depressor portion 21 causes an axial adjustment thereof so as to dispose the outer portion 21 selectively at a desired position axially of the cooperating recess portions 18 and 19.

To effect such rotative adjustment of the valve depressor portion 21, the service tool structure is provided with a first projection portion 22 extending from a handle portion 23 of the tool and defining at its distal end a slotted depressor engaging portion 24. Projection 22 further defines a cylindrical portion 25 inwardly of the slotted portion 24 adapted to receive the outer end of the gasket 13, as shown in FIG. 3, so as to permit the insertion of the gasket 13 through the recess 18 into the outer portion of the nipple recess 19, as shown in FIG. 2. Such insertion may be effected by a simple axial movement of the tool inwardly with the gasket mounted thereon, as shown in FIG. 2.

To complete the installation of gasket 13 within the nipple recess 19 about the valve depressor 12, tool 10 defines a second projection portion 26 having a male thread 27 adapted to mate with the female thread 18 defining the nut recess. The distal end of the projection 26 defines a planar end surface 28. Thus, as seen in FIG. 3, threading of the projection 26 into the threaded recess 18 causes the end surface 28 thereof to bear against the outer end of the gasket 13 partially installed in the hose coupling and urge the gasket further axially inwardly into the nipple recess 19.

The inward movement of the tool portion 26 may be continued until the end surface 28 thereof abuts the end surface 29 of the nipple. As shown in FIG. 3, the axial length of the gasket 13 is approximately that of the nipple recess 19 so that when the end surface 28 of the tool portion 26 abuts the distal end 29 of the nipple, the gasket is fully installed within the nipple recess 19 in proper embracing relationship to the valve depressor 12.

When it is desired to remove gasket 13 from the hose coupling, such as in replacement thereof, a third projection portion 30 of the tool is utilized. More specifically, as illustrated in FIG. 5, portion 30 defines a small diameter insert 31 having an outer helical groove 32 defining a thread adapted to be threaded into the gasket 13 about the core depressor so as to obtain a firm secured grip on the gasket, permitting it to be forcibly withdrawn from nipple recess 19.

More specifically, insert portion 31 is provided with a central bore 33 to accommodate the valve depressor during the gasket withdrawing operation. Further, the insert may have flatted sides 34 whereby groove 32 effectively defines an interrupted thread for improved gripping coaction with the inner surface of the gasket. The flatted sides 34 distort the gasket 13 when insert portion 31 is threaded thereinto to an oval shape thereby minimizing engagement of the gasket with the nipple in the retaining recess 19, thereby simplifying removal of the gasket.

In the illustrated embodiment as best seen in FIG. 6, the helical groove thread 32 preferably defines a rearwardly facing planar leading surface 39, an annular root surface 40, a frusto-conical trailing surface 41, and a flat crest 42 defining the lands between the thread turns. The illustrated groove thread 32 provides an improved positive gripping of the gasket when the insert portion 31 is threaded into the gasket while yet permitting facilitated threaded insertion thereinto during the gasket removal operation.

In the illustrated embodiment, the entire tool may be formed of molded synthetic resin. Thus, the groove thread 32 may be readily formed integrally in the molding operation at low cost while yet providing the unique gasket holding configuration.

As shown in FIG. 1, tool handle 23 may be further provided with a fourth projection portion 35 defining a hollow recess 36 which may be selectively closed by a pullout plug 37 for storing spare gaskets and valve depressors as desired. As shown, recess 36 may extend fully to projection portion 30 so as to provide a substantial storage recess volume within the tool handle 23.

In the illustrated embodiment, projection portion 22 may comprise a molded synthetic resin element locked to a hub 38 on the handle 23 by means of annular ribs 43 on the element 22 interlocked with grooves 44 on the hub, and a key portion 45 on the element received in a keyway slot 46 on the hub. To facilitate threaded rotation of the element 22, a serrated finger-gripping portion 39 may be provided thereon.

To provide a more forceful urging of the gasket fully into the nipple recess 19 by the threaded projection 26, the tool handle may be utilized as the turning handle. Facilitated manipulation in such turning operation is permitted by the generally cross-shaped arrangement of the handle permitting facilitated grasping thereof in the turning operation. Similarly, the forceful threading of the tool insert portion 31 into the gasket in the gasket removal operation and the forceful pulling of the gasket outwardly from the nipple may be readily effected by suitable grasping of the handle portion 23.

Thus, the improved service tool structure of the present invention provides for a facilitated two-step installation of the gasket in the hose coupling with a portion of the tool being synergistically adapted for use in adjusting the valve core depressor thereof. The invention further comprehends an improved male threaded means for effecting facilitated withdrawal of the installed gasket when desired. The handle structure of the tool provides for facilitated manipulation thereof in effecting the desired servicing operations.

The foregoing disclosure of specific embodiments is illustrative of the broad inventive concepts comprehended by the invention.

I claim:

1. A service tool structure for forcibly coaxially installing an annular gasket in a complementary hose coupling recess defining a threaded outer portion and an inner portion having an axially adjustable valve depressor coaxially therein, said tool structure comprising:

a handle;

a first projection on the handle defining means for releasably carrying the gasket coaxially thereon for coaxial insertion of the projection and gasket thereon into an outer portion of the coupling recess to retain initially an axially inner portion of the gasket in the recess coaxially about an axially outer portion of the valve depressor in a partially installed disposition thereof; and a second projection on the handle defining a transverse end surface defining means for engaging the outer end of the gasket fully about the annular extent thereof and defining threaded means for cooperating with the threaded recess portion of the coupling for threadedly urging said end surface coaxially toward the valve depressor and thereby urge the gasket coaxially inwardly about the valve depressor to a fully installed disposition thereof.

2. The service tool of claim 1 wherein said first projection further defines means for rotatively adjusting the valve depressor.

3. The service tool of claim 1 wherein the coupling defines an annular shoulder at the outer end of said recess inner portion and said second projection defines means for abutting said shoulder at the inward limit of movement thereof whereby said gasket outer end is disposed at the plane of said shoulder in the installed disposition thereof.

4. The service tool of claim 1 wherein the hose coupling includes a nut defining said recess threaded outer portion and a nipple defining said recess inner portion and threadedly coaxially carrying said valve depressor to extend axially outwardly therefrom into said outer portion, said tool structure second projection having an axial threaded length approximately that of said recess threaded outer portion.

5. The service tool of claim 1 wherein said first projection further defines means on said handle for rotatively adjusting the valve depressor.

6. A service tool structure for forcibly coaxially installing an annular gasket in a complementary hose coupling recess defining a threaded outer portion and an inner portion having an axially adjustable valve depressor coaxially therein, said tool structure comprising:

a handle;

a first projection on the handle defining means for releasably carrying the gasket coaxially thereon for coaxial insertion of the projection and gasket thereon into an outer portion of the coupling recess to retain initially an axially inner portion of the gasket in the recess coaxially about an axially outer portion of the valve depressor in a partially installed disposition thereof;

a second projection on the handle defining a transverse end surface defining means for engaging the outer end of the gasket fully about the annular extent thereof and defining threaded means for cooperating with the threaded recess portion of the coupling for threadedly urging said end surface coaxially toward the valve depressor and thereby urge the gasket coaxially inwardly about the valve depressor to a fully installed disposition thereof; and a third projection on the handle defining a threaded distal portion for threading into the gasket for use in pulling the gasket forcibly from the recess inner portion as in replacement thereof.

7. The service tool structure of claim 6 wherein said third projection defines an axial bore adapted to receive the outer end of the core depressor.

8. The service tool structure of claim 6 wherein said third projection defines flatted sides.

9. The service tool structure of claim 6 wherein said threaded distal portion of the third projection is defined by a helical groove having a planar rearwardly facing surface.

10. The service tool structure of claim 6 wherein said threaded distal portion of the third projection is defined by an interrupted helical groove.

11. A service tool structure for forcibly coaxially installing an annular gasket in a complementary hose coupling recess having an axially adjustable valve depressor coaxially therein, said tool structure comprising:

a handle;

means on the handle for installing the gasket within the recess; and threaded means on the handle for threading into the installed gasket to provide a connection thereto permitting axial withdrawal of the gasket from the recess as for replacement thereof.

12. The service tool of claim 11 wherein said threaded means comprises an interrupted helical thread.

13. The service tool of claim 11 wherein said threaded means comprises an interrupted helicl thread having a planar rearwardly facing leading surface and a frusto-conical forwardly facing trailing surface.

14. The service tool of claim 11 wherein said threaded means defines an axial recess for accommodating said valve depressor when the threaded means is threaded into the installed gasket.

* * * * *